(12) United States Patent
Fangmann et al.

(10) Patent No.: US 7,083,185 B2
(45) Date of Patent: Aug. 1, 2006

(54) HOUSING FOR MOTOR VEHICLE AIRBAG

(75) Inventors: Thomas Fangmann, Dinklage (DE); Keit Wagener, Bissendorf (DE)

(73) Assignee: ZF Lemförder Metallwaren AG (DE)

( * ) Notice: Subject to any disclaimer, the term of this patent is extended or adjusted under 35 U.S.C. 154(b) by 175 days.

(21) Appl. No.: 10/250,792

(22) PCT Filed: Oct. 10, 2002

(86) PCT No.: PCT/DE02/03810

§ 371 (c)(1),
(2), (4) Date: Jul. 7, 2003

(87) PCT Pub. No.: WO03/033311

PCT Pub. Date: Apr. 24, 2003

(65) Prior Publication Data

US 2004/0041381 A1    Mar. 4, 2004

(30) Foreign Application Priority Data

Oct. 12, 2001    (DE) .................................. 101 50 275

(51) Int. Cl.
*B60R 21/16* (2006.01)
*B60R 21/26* (2006.01)
(52) U.S. Cl. .................... 280/728.2; 280/731; 280/740
(58) Field of Classification Search ............. 280/728.2, 280/740, 731, 732
See application file for complete search history.

(56) References Cited

U.S. PATENT DOCUMENTS

| 5,354,093 | A |   | 10/1994 | Schenck et al. |          |
|-----------|---|---|---------|----------------|----------|
| 5,407,223 | A | * | 4/1995  | Lauritzen et al. | 280/728.2 |
| 5,423,568 | A | * | 6/1995  | Zushi et al.   | 280/728.2 |
| 5,425,548 | A | * | 6/1995  | Rasmussen      | 280/728.2 |
| 5,496,065 | A |   | 3/1996  | Osborne et al. |          |
| 5,503,426 | A | * | 4/1996  | Lang et al.    | 280/728.2 |
| 5,542,692 | A | * | 8/1996  | Shaklik et al. | 280/728.2 |
| 5,547,213 | A | * | 8/1996  | Lang et al.    | 280/728.2 |
| 5,558,363 | A | * | 9/1996  | Dahl           | 280/728.2 |
| 5,564,742 | A | * | 10/1996 | Clark et al.   | 280/740  |
| 5,582,423 | A | * | 12/1996 | Rion et al.    | 280/728.2 |
| 5,709,401 | A | * | 1/1998  | Schenck        | 280/728.2 |
| 5,791,682 | A |   | 8/1998  | Hiramitsu et al. |        |
| 6,250,666 | B1| * | 6/2001  | Ross           | 280/728.2 |
| 6,431,581 | B1|   | 8/2002  | Wagener et al. |          |

FOREIGN PATENT DOCUMENTS

DE    195 04 575 A1    10/1996
DE    197 03 767 A1     8/1998

* cited by examiner

*Primary Examiner*—Eric Culbreth
(74) *Attorney, Agent, or Firm*—McGlew & Tuttle, PC

(57) ABSTRACT

A housing for an inflatable air bag of a motor vehicle is presented, which has a gas generator, a mounting space for inserting the folded air bag as well as a diffusor made integrally with the housing for the uniform distribution of the gas released by the fired gas generator. The gas generator is inserted into the diffusor and has a positive-locking connection with the diffusor chamber inner wall for its fixation in the diffusor.

19 Claims, 2 Drawing Sheets

HOUSING FOR MOTOR VEHICLE AIRBAG

FIELD OF THE INVENTION

The present invention pertains to a housing for an inflatable air bag of a motor vehicle with a gas generator, a mounting space for inserting the folded air bag, a diffusor made integrally with the housing for the uniform distribution of the gas released by the fired gas generator, wherein the gas generator is inserted into the diffusor.

BACKGROUND OF THE INVENTION

Such a housing, as is known from DE 197 03 767 A1, has a gas generator, a mounting space for inserting the folded air bag as well as a diffusor made integrally with the housing for the uniform distribution of the gas released by the fired gas generator. The gas generator is inserted directly into the diffusor. As a consequence of the increasing safety requirements on motor vehicles, inflatable air bags that are to prevent severe injuries to the persons located in the vehicle in an accident are also increasingly used in a great variety of designs. For a long time, the use of inflatable air bags has not been limited to higher end vehicles only. They are rather also provided in vehicles of the lower price categories. However, the need to enable the housings to be manufactured at a low cost increases herewith as well. Associated with this is the requirement to reduce the number of components as well as the effort needed for assembly in both the manufacture of the housing itself and the installation of the housing in the motor vehicle.

Inserting the gas generator directly in a diffusor made integrally with the housing for an inflatable air bag is also known from DE 197 03 767 A1. According to a solution presented in this document, the gas generator is, however, screwed to the housing on one side or is held on the housing by means of a snap connection. On the opposite side of the screw connection, the gas generator has a sealing area. The assembly effort that becomes necessary due to the necessary screw connection of the gas generator with the housing accommodating same as well as the necessary components and precautions to be taken on the housing are rather expensive and therefore uneconomical.

SUMMARY OF THE INVENTION

The basic technical object of the present invention is to provide a housing for an inflatable air bag, which can be manufactured and mounted economically and whose assembly is simplified compared with prior-art solutions.

According to the invention, a housing for an inflatable air bag of a motor vehicle is provided with a gas generator, a mounting space for inserting the folded air bag, a diffusor made integrally with the housing for the uniform distribution of the gas released by the fired gas generator. The gas generator is inserted into the diffusor. The gas generator has a positive-locking and non-positive connection to the diffusor chamber inner wall for its fixation in the diffusor. Due to such a design, the gas generator is closely and tightly surrounded at least by a part of the diffusor chamber inner wall, because the said inner wall should preferably have an inner contour complementary to the outer contour of the gas generator, so that the inner contour essentially follows the gas generator. Corresponding to the solution proposed, the gas generator is accommodated in the diffusor of the housing. Holding of the gas generator is thus possible without additional auxiliary means. The assembly of the housing is thus considerably simplified, because, e.g., no screw connection of the gas generator to the housing is necessary. Moreover, it is also possible to use, e.g., snap connections or similar solutions to lock the gas generator in the housing. Due to the large-area contact between the outer contour of the gas generator and the inner contour of the diffusor chamber, the fastening of the gas generator can likewise be made possible predominantly by means of a frictional engagement.

According to one embodiment of the solution according to the present invention, the interference fit of the gas generator within the diffusor can be achieved by a press fit between the gas generator and the diffusor chamber inner wall. The gas generator is pressed for this purpose directly into the diffusor chamber during the assembly of the housing. The diffusor chamber may be made, e.g., slightly conical for this purpose.

An advantageous variant with an additional increase in the holding force of the gas generator within the diffusor chamber can be obtained by the positive-locking connection between the gas generator and the diffusor chamber inner wall being prepared by means of an edge flange formed after the insertion of the gas generator into the diffusor chamber. This edge flange can be brought into contact with the outer surface of the gas generator according to a prior-art forming process. This process is, e.g., an ultrasound forming or welding process or orbital forming or welding process or other heat treatments for plastic housings. Edging is also possible in the case of metallic housing or in case of the use of plastic-metal hybrid materials, so that the edge flange fixes the gas generator in the diffusor chamber.

According to another suggestion to improve prior-art housings for inflatable air bags, it is, furthermore, suggested that the diffusor be equipped with a diffusor cap in the direction in which the gas is discharged. This cap has a plurality of discharge openings for the optimized release of the gas generated by the gas generator in order to thus guarantee a uniform opening and constant inflation of the air bag. Accordingly, the discharge openings should be arranged distributed at uniformly spaced locations over the diffusor cap. The diffusor cap is defined in the sense of the present invention as the part of the diffusor that is the upper part in the direction of gas flow.

The folded air bag pulled over the diffusor may, furthermore, be fastened in the mounting space accommodating the air bag by means of holding members. These holding members may be designed as clamping hooks according to one embodiment of the present invention. Since the air bags have a flange area for installation in the housings, it is possible in a simple manner to provide this connection flange with corresponding complementary openings for snapping in the clamping hooks.

To facilitate the mounting of the air bag, it is, furthermore, proposed that the housing be equipped with mounting openings on its underside located opposite the gas discharge side. These mounting openings may be used, e.g., to introduce mounting hooks into the interior of the housing, by means of which the clamping hooks can be deformed, so that the air bag with its connection flange can be guided over the clamping hooks.

To make possible the economical installation of the housing for an inflatable air bag according to the invention being described here in the motor vehicle, the housing is provided according to a variant with fastening hooks on its underside located opposite the gas discharge side, the fastening hooks being able to be snapped into corresponding recesses of a motor vehicle component. Due to the measures mentioned above, the housing for accommodating an inflatable air bag can be assembled in a very short time, on the one hand, and it is, moreover, possible in a simple manner to introduce the housing thus finished into a motor vehicle, so that a very economical solution can be provided by the present invention as a whole.

The motor vehicle component may be a steering wheel. It is, of course, also possible to design the housing according to the present invention as a passenger air bag housing, in which case the motor vehicle component would be the dashboard or a support in the front area.

To absorb the explosion forces occurring during the triggering of the gas generator, it is proposed according to another embodiment of the present invention that the gas generator be provided on its underside located opposite the gas discharge side with contact surfaces, which come directly into contact with the motor vehicle component located under them and are thus supported against this motor vehicle component only in case of triggering. A short distance may be present between the underside of the gas generator and the closest motor vehicle component in the non-triggered state of the gas generator. This leads, moreover, to the favorable effect that rattling noises cannot occur during travel.

To compensate tolerances and to avoid or reduce vibrations that occur during travel, it is, moreover, useful to insert a compensating and/or sealing element between the diffusor chamber inner wall and the gas generator. In this simplest case, this sealing element may be a rubber ring, which may be inserted, e.g., loosely.

To confer the necessary stability on a housing according to the present invention for an inflatable air bag, it is, moreover, possible to prepare reinforcing ribs for stiffening and/or to design the housing as a multiwall housing. It is advantageous in terms of the economical manufacturability of the housing to manufacture the housing as a whole as a one-part housing, e.g., from a plastic or a metal-plastic hybrid material. Thus, only a small number of working steps are necessary to produce the housing according to the present invention, to connect it to the gas generator and to integrate this subsequently in the motor vehicle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
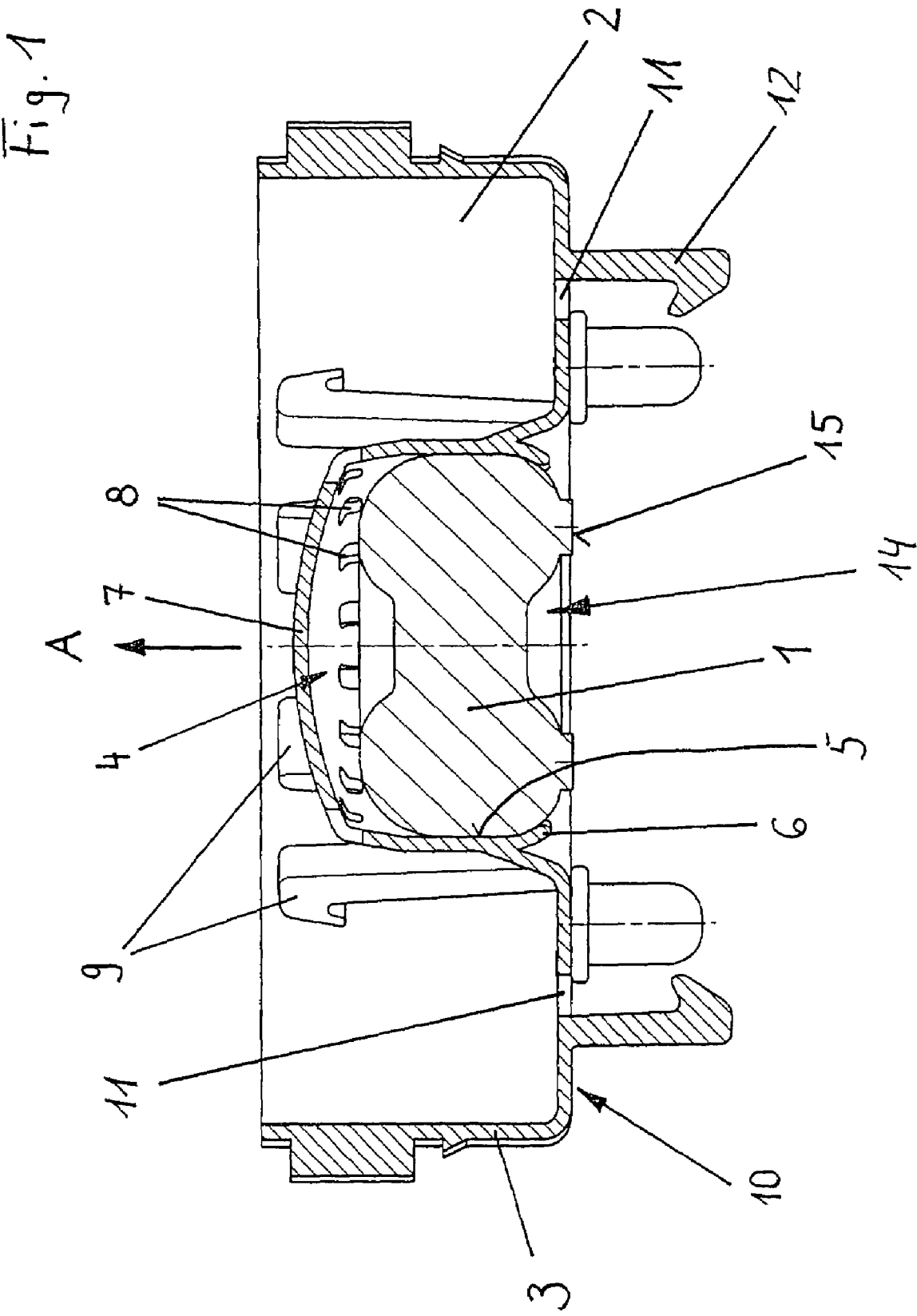
FIG. 1 is a sectional view of a first embodiment of a housing for an inflatable air bag.
Figure 2:
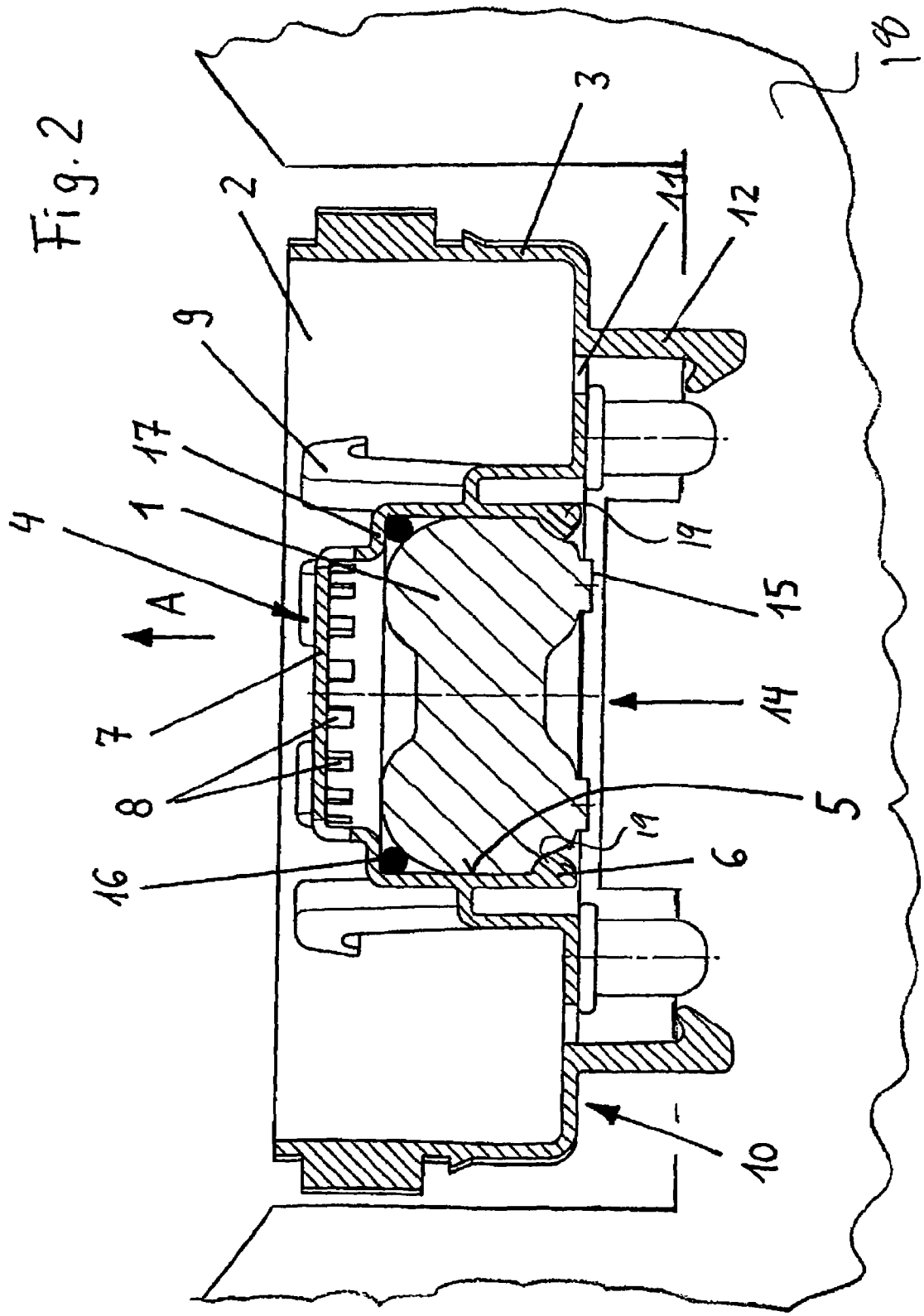
FIG. 2 is a sectional view of a second embodiment variant of a housing for an inflatable air bag.

Referring to the drawings in particular, the housings 3 shown in FIGS. 1 and 2 for an inflatable air bag are made entirely of plastic or a metal-plastic hybrid material.

The housing 3 has a mounting space 2 for the insertion and fastening of the folded air bag. The air bag was not shown in the drawings for reasons of simplification. A diffusor, designated by 4 as a whole, is arranged in the central area of the housing 3. A gas generator 1 is inserted into the diffusor. The said gas generator is firmly in contact with the diffusor chamber inner wall 5 in a frictionally engaged manner. In the direction A of gas discharge, i.e., above the gas generator 1 in the figures, the diffusor 4 has a diffusor cap 7. This diffusor cap 7 is provided with discharge openings 8 distributed uniformly over its circumference. The gas generated by the gas generator 1 in case of triggering is released uniformly into the air bag through the discharge openings 8, so that the air bag can likewise be inflated uniformly. In the embodiment variants of a housing 3 according to the present invention, which are shown in FIGS. 1 and 2, the gas generator 1 is connected to the diffusor chamber inner wall 5 by means of a press fit and is also held by means of an edge flange 6 formed after the insertion of the gas generator 1 into the diffusor chamber wall. However, the formed edge flange 6 may also be designed as a snap connection 19 Thus secure snug fit of the gas generator 1 in the diffusor 4 can be guaranteed.

On the underside 14 of the gas generator 1 located opposite the gas discharge side of the gas generator 1, the gas generator has contact surfaces 15, which are located in the normal state at a slightly spaced location from a motor vehicle component, such as a steering wheel 18. As a consequence of the dynamic effect generated by the triggering of the gas generator 1, this distance is reduced to zero, so that the gas generator 1 is supported over its contact surfaces 15 directly on the motor vehicle component 18.

Moreover, a common feature of the embodiment variants of a housing 3 for an inflatable air bag, which are shown in FIGS. 1 and 2, is that on the inner side of the housing 3, i.e., in the mounting space 2, they have holding members 9 in the form of clamping hooks, which engage corresponding openings of a mounting flange fastened to the air bag, so that the air bag can be fastened by means of these holding members 9 within the mounting space 2 of the housing 3. Mounting openings 11 on the underside 10 of the housing 3 are used to facilitate the mounting of the air bag.

To make possible the rapid fastening of the housing 3 to the motor vehicle component, the housing has, moreover, fastening hooks 12 on its underside 10, and these fastening hooks can be snapped into corresponding recesses of the motor vehicle component. It is thus possible to accomplish the object of mounting a housing according to the present invention and of installing the housing in the motor vehicle without great effort, rapidly and in an uncomplicated manner.

The housings 3, having basically the same design, as they are shown in FIGS. 1 and 2, differ from one another partly by the design of the diffusor cap 7. This is spherical in the embodiment according to FIG. 1 and has a flat surface in the variant according to FIG. 2. Moreover, as is apparent from FIG. 2, a compensating or sealing element 16 is provided in the housing 3 between the diffusor chamber inner wall 5 and the gas generator 1. This compensating or sealing element 16 between the diffusor chamber inner wall 5 and the gas generator 1 is used here for tolerance and vibration compensation. To improve the contact of the compensating or sealing element 16, the diffusor 4 is provided with a-retracted flange-like area 17 in the area of the compensating or sealing element 16.

While specific embodiments of the invention have been shown and described in detail to illustrate the application of the principles of the invention, it will be understood that the invention may be embodied otherwise without departing from such principles

The invention claimed is:

1. A housing for an inflatable air bag of a motor vehicle with a gas generator, the housing comprising: a single integral structure defining a pot shaped mounting space for inserting a folded air bag, a diffusor made integrally with said housing for uniform distribution of gas released by a fired gas generator, wherein said gas generator is inserted into said diffusor, and said gas generator has a positive-locking connection with a diffusor chamber inner wall for its fixation in said diffusor;

holding members for fastening the air bag, said holding members beings provided in said mounting space for inserting the folded air bag, said holding members are clamping hooks.

2. A housing for an inflatable air bag in accordance with claim 1, wherein a press fit is also included between said gas generator and said diffusor chamber inner wall.

3. A housing for an inflatable air bag in accordance with claim 1, wherein the positive-locking connection between said gas generator and said diffusor chamber inner wall comprises an edge flange formed after the insertion of the gas generator into the diffusor.

4. A housing for an inflatable air bag in accordance with claim 1, wherein the positive-locking connection between said gas generator and said diffusor chamber inner wall comprises a snap connection.

5. A housing for an inflatable air bag in accordance with claim 1, wherein said diffusor has a diffusor cap with discharge openings for releasing gas in a gas discharge direction.

6. A housing for an inflatable air bag in accordance with claim 5, wherein said discharge openings are distributed at uniformly spaced locations over said cap.

7. A housing for an inflatable air bag in accordance with claim 5, wherein:

said diffusor cap with said discharge openings is arranged at an axial end of said diffusor chamber inner wall.

8. A housing for an inflatable air bag in accordance with claim 7, wherein:

said diffusor cap closes said diffusor chamber inner wall at said axial end of said diffusor chamber inner wall.

9. A housing for an inflatable air bag in accordance with claim 8, wherein:

said positive locking connection between said gas generator and said diffusor chamber inner wall includes an edge flange formed after insertion of said gas generator into said diffusor, said edge flange being arranged at an end of said diffusor chamber wall axially opposite said diffusor cap.

10. A housing for an inflatable air bag in accordance with claim 8, wherein:

said positive locking connection between said gas generator and said diffusor chamber inner wall includes an edge flange formed after insertion of said gas generator into said diffusor;

said gas generator being arranged between said edge flange and said diffusor cap.

11. A housing for an inflatable air bag in accordance with claim 8, wherein:

said diffusor cap is hemi-spherical.

12. A housing for an inflatable air bag in accordance with claim 8, wherein:

said housing and said diffusor are formed entirely from plastic.

13. A housing for an inflatable air bag in accordance with claim 1, wherein said housing has a gas discharge side; said housing has mounting openings on an underside located opposite the gas discharge side.

14. A housing for an inflatable air bag in accordance with claim 1, wherein said housing has a gas discharge side; said housing has fastening hooks for connection to a motor vehicle component on an underside located opposite the gas discharge side.

15. A housing for an inflatable air bag in accordance with claim 14, wherein the motor vehicle component is a steering wheel.

16. A housing for an inflatable air bag in accordance with claim 14, wherein on an underside located opposite the gas discharge side, said gas generator has contact surfaces supported on a motor vehicle component in case of triggering of said gas generator.

17. A housing for an inflatable air bag in accordance with claim 1, wherein a compensating or sealing element is inserted between said gas generator and said diffusor chamber inner wall.

18. A housing for an inflatable air bag in accordance wit claim 1, wherein said housing, which is made as a whole in one piece, consists of plastic or a metal-plastic hybrid material.

19. A housing for an inflatable air bag of a motor vehicle with a gas generator, the housing comprising: a mounting space for inserting a folded air bag, a diffusor made integrally with said housing for uniform distribution of gas released by a fired gas generator, wherein said gas generator is inserted into said diffusor, and said gas generator has a positive-locking connection with a diffusor chamber inner wall for its fixation in said diffusor, said housing has a gas discharge side, said gas generator has contact surfaces on an underside located opposite the gas discharge side, said contact surfaces being supported on a motor vehicle component in case of triggering of said gas generator.

* * * * *